Dec. 5, 1967 R. RUPERT ET AL 3,356,846

INFRARED DETECTOR MOUNTED ON THERMOELECTRIC COOLING MEANS AND WITHIN A CONTAINER OF INERT GAS

Filed April 9, 1965

Inventors
Robert Rupert
Norman C. Anderson
Dominik & Stein
Attorneys

United States Patent Office 3,356,846
Patented Dec. 5, 1967

3,356,846

INFRARED DETECTOR MOUNTED ON THERMOELECTRIC COOLING MEANS AND WITHIN A CONTAINER OF INERT GAS

Robert Rupert, Wakefield, Mass., and Norman C. Anderson, Santa Barbara, Calif., assignors to Infrared Industries, Inc., Santa Barbara, Calif., a corporation of Delaware Filed Apr. 9, 1965, Ser. No. 446,912
3 Claims. (Cl. 250—83)

ABSTRACT OF THE DISCLOSURE

A detector such as an electromagnetic radiation detector or an infrared detector which is effectively shielded from extraneously activating influences by mounting the detector on a thermal electric cooling means, then packaging it within a container of an inert gas within which a major portion of the volume of the container is filled with a foam plastic such as polystyrene.

This invention relates to detectors and more particularly to a novel packaging concept for a thermoelectrically cooled detector.

One of the problems in using a detector such as an electromagnetic radiation detector or an infrared detector involves the influence of extraneous heat or cold. To efficiently use it, one must shield it from such extraneous sources. For example, in detecting a heat source, the detector should not be activated by other heat sources or by ambient heat. Furthermore, since it is known that the detector operates best at a certain temperature, generally in the cold, means to accomplish this result are desirable. However, condensation of water on the detector occurs by reason of such cooling means. To avoid this, the detector and the cooling means have been packaged in a vacuum. However, the vacuum tends to degrade with time due to outgasing of the various elements exposed to the vacuum as well as occasional leakage.

An object of this invention is to provide a novel enclosure for a detector.

A further object of this invention is to provide the best operating conditions for such detector.

A still further object is to provide conditions for a detector such as an electromagnetic radiation detector or an infrared detector uninfluenced by extraneous heat and/or cold sources.

Another object is to provide a vacuum atmosphere for a detector not subject to undesirable outgasing.

Another object is to provide an enclosure which is economical to construct using standard materials and machinery.

Other objects of the invention will in part be obvious and will in part appear hereinafter.

The invention accordingly comprises an article of manufacture possessing the features, properties, and the relation of elements which will be exemplified in the article hereinafter described, and the scope of the invention will be indicated in the claims.

It has now been found that a detector, such as an electromagnetic radiation detector or an infrared detector can be effectively shielded from extraneous activating influences by mounting the detector on a thermoelectric cooling means, such as the Pesco cooler which is commercially available from Borg Warner, Chicago, Ill., then packaging it within a container of an inert gas within which a major portion of the volume of the container is filled with a foam plastic such as polystyrene.

More particularly, and with reference to the attached drawing, a novel packaging concept has been found which avoids most of the undesirable features previously existing. As seen in FIGS. 1 and 2, the infrared detector, or similar electronic detector 12 is mounted atop a cooling means 14 (shown in schematic form only) which is potted in place inside a container 16. The leads 24 of the detector, and 32 of the cooler, extend through the container wall. Foam plastic 18, in tubular form and having a hollowed-out base, or else, in the preferred form, "pour-in-place" plastic foam, covers the cooler and the detector and occupies a major portion of the volume of the container, but for a center cavity 30 which permits access of the radiant energy being detected to the detector being utilized. The container 16 is filed with a pressure of an inert gas, such as argon, krypton, helium, nitrogen and the like, and sealed with a top 20 having a window 22. This can be accomplished by coupling the container 16 to a vacuum pump by means of a small glass or metal tubulation (not shown) which has been potted into the container, along with the lead connections, to provide a means for air and moisture removal. The air and moisture have been removed sufficiently when a vacuum level of $1\times10^{-5}$ torr. has been maintained for several hours. Cold trapping is advantageously employed in the evacuation line to expedite removal of condensable vapors. The evacuated container is then back-filled with the dry inert gas to a pressure of one atmosphere. The glass or metal tubulation is then sealed and cut-off. Because there is no pressure differential across the container wall, the inert gas therein will not become diluted by foreign gases leaking into the container as would be the case with a vacuum-type container. For the infrared detector embodiment, the window is infrared transmitting.

For a fuller understanding of the nature and objects of the invention, reference should be had to the following detailed description taken in connection with the accompanying drawings.

Similar reference characters refer to similar parts throughout the several views of the drawings.

Figure 1:
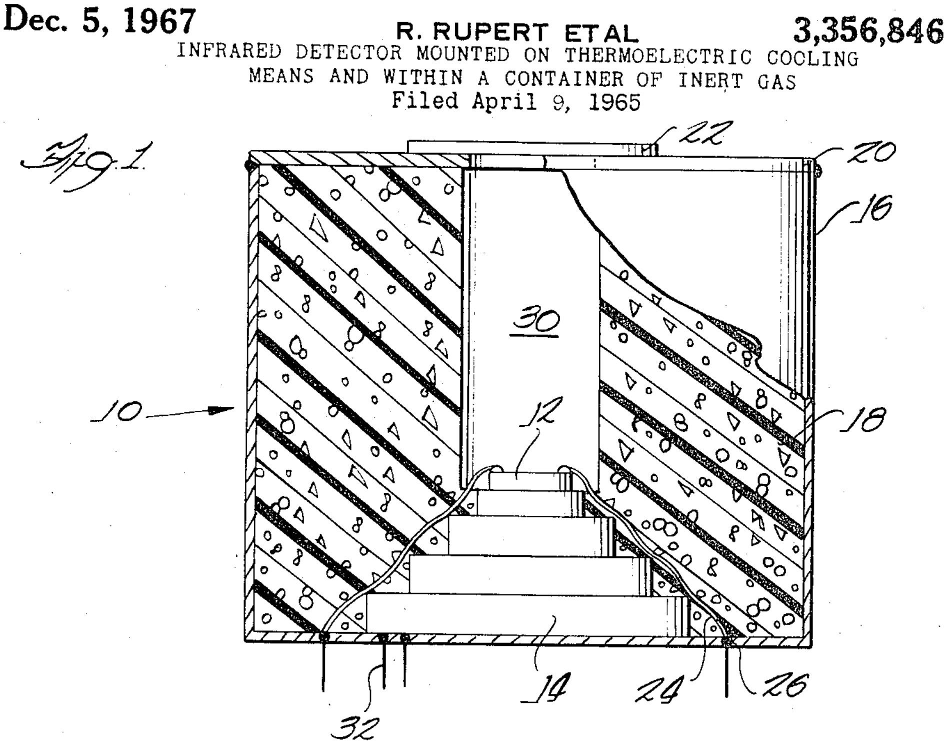
FIG. 1 is a cross-sectional view of the infrared detector of this invention.
Figure 2:
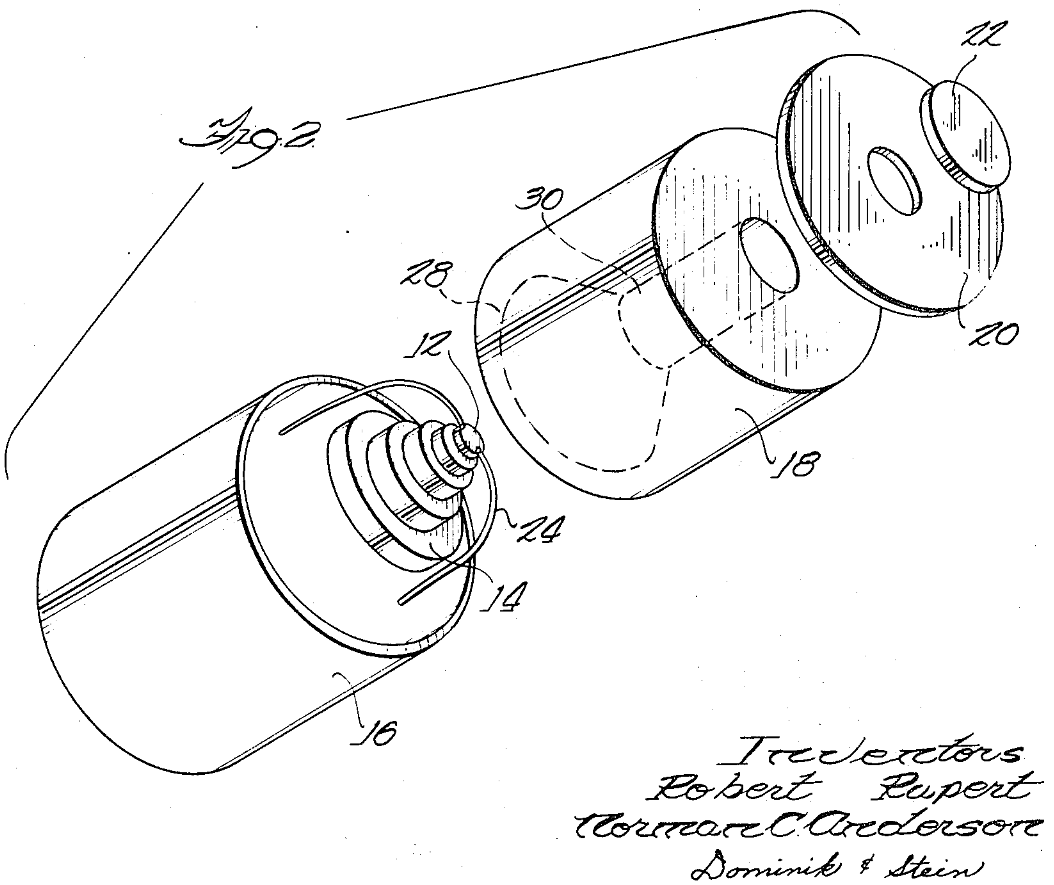
FIG. 2 is an exploded perspective view.

As seen in FIG. 2, the elements of the detector 10 of this invention comprise an electronic detector element 12, such as an infrared detector, mounted upon a pyramidal array comprising a cooling means 14, such as a Pesco cooler. The leads 24 of the detector drape over the cooling means 14 and extend through the wall via a feedthrough 26 (see FIG. 1). Leads 32 of the cooler also extend through the wall.

The cooling means are potted axially within container 16 (see FIG. 1); usually a metal can is satisfactory, although glass, plastic, or ceramic containers may also be used. After potting, a tube of insulation 18, preferably liquid foam plastic which is poured into the can is placed over the detector and the cooler. A removable axial tube prevents the liquid foam from filling center cavity 30. In the alternative, a tube of insulation with a cavity 28 in its base, conforming to the cooler detector array, may also be used. The insulation may comprise foam plastic, such as polystyrene, polyethylene, polymethane, or asbestos, fiber glass, and the like.

Then the container is flushed with an inert gas, such as argon, krypton, helium, nitrogen and the like, preferably at a partial pressure. This suppresses any further outgasing of the other elements of the container body. Also, the gas has a low thermal conductivity so that in use, infrared transmitting window 22 does not cool appreciably by reason of cooling means 14. In addition, should the gas temperature be reduced low enough to induce excessive cooling of the transmitting window 22, an effective counterheat flow is applied to the window by virtue of the window being mounted in intimate thermal contact with metallic cover 20 and container 16. Therefore, no moisture condenses on it, so that unimpaired transmission may occur.

The container 16, is then sealed with cover 20, which contains window 22 (see FIG. 2). The method used may be the customary can-sealing techniques used in ordinary canning processes.

As constructed, the radiation being sensed reaches the detector 12 after passing through the infrared transmitting window and the inert gas atmosphere therein. The cooling means 14 is shielded from thermal loading by reason of the foam plastic 18. Likewise, the detector is shielded from the atmosphere by inert gas in the container 16. Thus, there is no condensation of water vapor from the atmosphere upon the detector surface when it is cooled to its optimum operating temperature. A mere vacuum would not be as satisfactory an answer to the problem because of the outgasing of various elements exposed to said vacuum. Now with the structure of this invention, the majority of the vacuum space is replaced with the foam plastic, which is a good insulation and does not place as great a thermal load on the cooling means as with atmospheric exposure.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings will be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

1. A detector structure comprising a container, a temperature regulating means positioned therein, an electronic detector positioned on said temperature regulating means with leads extending outside said container, a body of insulation enclosing said temperature regulating means and said detector and having a transmitting orifice therein for said detector for shielding said temperature regulating means from thermal loading, a cover with a window thereon and an atmosphere of inert gas within said container.

2. An infrared detector structure comprising a container, a cooling means positioned therein, an infrared detector positioned on said cooling means with leads extending outside said container, a body of poured-in-place plastic foam enclosing said cooling means and said infrared detector and having a transmitting orifice therein for said detector for shielding said cooling means from thermal loading, a cover with an infrared energy transmitting window therein in communication with said transmitting orifice and an atmosphere of inert gas within said container.

3. An infrared detector structure comprising a metallic can, a cooling means positioned axially therein on the inside surface of the base of said can, an infrared detector positioned on said cooling means with leads extending outside said can, a body of foam polystyrene enclosing said cooling means and said infrared detector and having a transmitting orifice therein for said detector for shielding said cooling means from thermal loading, a can cover sealed to said metallic can with an infrared energy transmitting window therein in communication with said transmitting orifice and an atmosphere of inert gas within said can.

References Cited

UNITED STATES PATENTS

| | | | |
|---|---|---|---|
| 3,013,156 | 12/1961 | Hearn | 250—83 |
| 3,103,587 | 9/1963 | Ure et al. | 350—83.3 |
| 3,255,351 | 6/1966 | Walsh et al. | 250—83 |
| 3,255,632 | 6/1966 | Brooks | 250—83 X |

ARCHIE R. BORCHELT, *Primary Examiner.*